United States Patent
Takenaka et al.

(10) Patent No.: US 9,018,317 B2
(45) Date of Patent: *Apr. 28, 2015

(54) PROCESS FOR PRODUCING PIGMENT DISPERSION COMPOSITION

(75) Inventors: Asami Takenaka, Tokyo (JP); Shigehiro Tanaka, Tokyo (JP); Yukari Ishibashi, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/984,072

(22) PCT Filed: Feb. 7, 2012

(86) PCT No.: PCT/JP2012/052666
§ 371 (c)(1),
(2), (4) Date: Sep. 6, 2013

(87) PCT Pub. No.: WO2012/108400
PCT Pub. Date: Aug. 16, 2012

(65) Prior Publication Data
US 2013/0338319 A1 Dec. 19, 2013

(30) Foreign Application Priority Data

Feb. 7, 2011 (JP) .................................. 2011-023702

(51) Int. Cl.
| | | |
|---|---|---|
| C08G 18/83 | (2006.01) | |
| C08K 5/3417 | (2006.01) | |
| C08K 5/3437 | (2006.01) | |
| C08L 75/04 | (2006.01) | |
| C08G 18/04 | (2006.01) | |
| C09C 1/56 | (2006.01) | |
| C09D 17/00 | (2006.01) | |
| C09D 11/324 | (2014.01) | |
| C08G 18/66 | (2006.01) | |
| C08G 18/75 | (2006.01) | |
| C08G 18/08 | (2006.01) | |
| C08G 18/34 | (2006.01) | |
| C08G 18/36 | (2006.01) | |
| C08G 18/38 | (2006.01) | |
| B82Y 30/00 | (2011.01) | |

(52) U.S. Cl.
CPC ............... *C08G 18/833* (2013.01); *C09C 1/56* (2013.01); *C09D 17/001* (2013.01); *C09D 11/324* (2013.01); *C08G 18/6662* (2013.01); *C08G 18/755* (2013.01); *C08G 18/0823* (2013.01); *C08G 18/348* (2013.01); *C08G 18/36* (2013.01); *C08G 18/3819* (2013.01); *C01P 2004/62* (2013.01); *C01P 2004/64* (2013.01); *C01P 2006/12* (2013.01); *C01P 2006/19* (2013.01); *B82Y 30/00* (2013.01)

(58) Field of Classification Search
CPC .. C08G 18/0823; C08G 18/348; C08G 18/36; C08G 18/3819; C08G 18/6662; C08G 18/755; C08G 18/833; C09C 1/56; C09D 11/324; C09D 17/001; C01P 2004/62; C01P 2004/64; C01P 2006/12; C01P 2006/19
USPC ......... 525/279, 286, 288, 293, 296, 313, 453; 106/31
See application file for complete search history.

(56) References Cited

U.S. PATENT DOCUMENTS

| 4,880,857 A | 11/1989 | Mori et al. | |
|---|---|---|---|
| 2011/0021675 A1* | 1/2011 | Shigemori et al. | ............... 524/88 |
| 2012/0190789 A1* | 7/2012 | Sekiyama et al. | ............ 524/591 |

FOREIGN PATENT DOCUMENTS

| EP | 2474566 A1 | 7/2012 |
|---|---|---|
| JP | 64-079278 A | 3/1989 |
| JP | 06-293863 A | 10/1994 |
| JP | 08-003498 A | 1/1996 |
| JP | 08-218015 A | 8/1996 |
| JP | 09-118821 A | 5/1997 |
| JP | 09-151316 A | 6/1997 |
| JP | 2004-515559 A | 5/2004 |
| JP | 2004-516355 A | 6/2004 |
| JP | 2007-291194 A | 11/2007 |
| JP | 2007-297436 A | 11/2007 |

(Continued)

OTHER PUBLICATIONS

Chinese Office Action dated Feb. 26, 2014, issued in corresponding Chinese Patent Application No. 201280008037.8, w/English translation (7 pages).
International Search Report for PCT/JP2012/052666, Mailing Date of Apr. 24, 2012.
Written Opinion for PCT/JP2012/052666, Mailing Date of Apr. 24, 2012.
Extended European Search Report dated Jun. 4, 2014, issued in European Patent Application No. 12744777.9 (6 pages).

*Primary Examiner* — Randy Gulakowski
*Assistant Examiner* — Christopher M Rodd
(74) *Attorney, Agent, or Firm* — Westerman, Hattori, Daniels & Adrian, LLP

(57) ABSTRACT

A method for producing a pigment dispersion composition having excellent image density, dispersibility, and storage stability, has high resolubility, and forms an ink film having excellent marker resistance and scratch resistance. The method includes bringing a pigment (I) having a surface acidic group and a basic compound (II) having two or more ammo groups selected from a primary amino group and a secondary amino group in its molecule, into contact with each other in an aqueous medium to prepare a pigment having an unreacted surface amino group, bringing the pigment into contact with a polyisocyanate polyurethane resin (III) having two or more isocyanate end groups so that the pigment and the polyisocyanate polyurethane resin are bonded via a urea bond to prepare a dispersion of a polyurethane resin-bonded pigment (A), and heating the dispersion of the polyurethane resin-bonded pigment (A) at 40 to 100° C. for 1 to 30 days.

3 Claims, No Drawings

(56) References Cited

FOREIGN PATENT DOCUMENTS

| | | |
|---|---|---|
| JP | 2007-308582 A | 11/2007 |
| JP | 2008-531778 A | 8/2008 |
| JP | 2011-202004 A | 10/2011 |
| WO | 00/68321 A1 | 11/2000 |
| WO | 02/50197 A1 | 6/2002 |
| WO | 2006/089933 A1 | 8/2006 |
| WO | 2008/146410 A1 | 12/2008 |
| WO | WO 2009119546 A1 * | 10/2009 |
| WO | 2011/027785 A1 | 3/2011 |
| WO | WO 2011027785 A1 * | 3/2011 |
| WO | 2012/020611 A1 | 2/2012 |

* cited by examiner

PROCESS FOR PRODUCING PIGMENT DISPERSION COMPOSITION

TECHNICAL FIELD

The invention relates to a process for producing a pigment dispersion composition.

BACKGROUND ART

In recent years, an aqueous ink that is safe and has small environmental impact has been used in various fields instead of an organic solvent-based ink. In business applications or the like, an odorless aqueous coloring material is indispensable as an ink used for printing in offices. In industrial applications, there has been an increasing tendency to reduce the use of an organic solvent as much as possible from the viewpoint of an improvement in working environment, an improvement in safety of ink and paint, and waste disposal. An aqueous coloring material also has an advantage in that the production cost can be reduced as compared with an organic solvent-based coloring material since special equipment (e.g., explosion-proof system, ventilator, and organic solvent recovery unit) is unnecessary during production.

A dye or a pigment has been mainly used as the aqueous coloring material depending on the application. A dye can easily form a high-resolution image that exhibits an excellent tone, but exhibits poor light resistance as compared with a pigment. A pigment exhibits poor dispersibility as compared with a dye, but exhibits excellent water resistance and light resistance. A number of pigment inks have been developed along with the development of a dispersion technique.

An aqueous liquid ink for gravure printing or offset printing has also been developed. An inkjet recording method has been most widely used as an aqueous ink recording method for office applications.

The inkjet recording method discharges ink droplets from a minute nozzle head to record characters or figures on the surface of a recording medium (e.g., paper). The noncontact inkjet recording method has been widely used since the noncontact inkjet recording method can implement easy on-demand full-color printing of an image on various recording media (e.g., plain paper) without requiring a printing plate.

An inkjet printer that utilizes the inkjet recording method discharges ink droplets from a minute nozzle head to record characters or figures on the surface of a recording medium (e.g., paper). Typical inkjet printing methods include a Bubble Jet (registered trademark) method and a piezo method. The Bubble Jet method instantaneously heats an ink introduced into the nozzle head using a heater to produce bubbles, and intermittently discharges the ink by utilizing the volume expansion due to the bubbles. The piezo method converts an electrical signal into a mechanical signal using an electrostrictive element (piezoelectric element), and intermittently discharges ink droplets stored in the nozzle head.

A black inkjet printer ink composition (inkjet ink composition) has been widely used in offices and the like mainly in order to print documents. A number of aqueous black pigment ink compositions that are optimized for the recording method and the recording speed of each printer have been proposed.

For example, Patent Document 1 discloses an aqueous black pigment ink composition that is provided with improved dispersibility in an aqueous medium by hydrophilizing the surface of the black pigment. However, since the ink composition disclosed in Patent Document 1 may penetrate when printed on plain paper, a decrease in image density, offset, curling of the recording paper, and the like may occur. In particular, since the amount of ink discharged per unit time has increased along with an increase in printing speed of inkjet printers, a sufficient image density may not be obtained when using a related-art aqueous black pigment.

Since a pigment exhibits a strong interparticle cohesive force, but exhibits weak affinity to an organic polymer, water, an organic solvent, and the like, it is very difficult to uniformly mix or disperse a pigment under normal mixing or dispersion conditions. In order to deal with this problem, a number of attempts have been made to improve the dispersibility of a pigment by improving the affinity of the pigment to a solid or liquid component by causing a dispersant (e.g., surfactant or resin) to be adsorbed on the surface of the pigment, or coating the entire surface of the pigment with the dispersant (see Patent Document 2, for example).

Since a printer used for industrial applications has a high print speed, and cannot be frequently subjected to head cleaning as compared with a printer used for personal applications, an inkjet ink composition that does not contaminate or clog the head during continuous or intermittent inkjet operations, and exhibits re-solubility (i.e., the dried ink composition is redissolved in the undried ink composition, and does not contaminate or clog the nozzle head during continuous or intermittent inkjet operations) has been desired.

RELATED-ART DOCUMENT

Patent Document

Patent Document 1: JP-A-08-003498
Patent Document 2: JP-A-08-218015

SUMMARY OF THE INVENTION

Technical Problem

In view of the above situation, the inventors of the invention conducted extensive studies, and found that an aqueous pigment ink composition in which a dispersant is adsorbed on the surface of a pigment has a problem in that the dispersant may be removed from the surface of the pigment due to a strong shear force that is applied when the ink composition is discharged from a thin nozzle of a nozzle head, or the dispersant may be removed from the surface of the pigment during long-term storage, whereby the dispersion state of the pigment may become unstable (i.e., the storage stability may deteriorate). The inventors also found that the viscosity of the pigment dispersion composition and the inkjet ink composition significantly decrease during long-term storage when the dispersant includes a hydrophilic group (e.g., acidic group), and disperses the pigment in the medium due to ionic repulsion with a neutralizer.

An object of the invention is to provide a method that easily produces a pigment dispersion composition that exhibits excellent image density, dispersibility, and storage stability, has high re-solubility, and forms an ink film that exhibits excellent marker resistance and scratch resistance.

Solution to Problem

The inventors conducted further extensive studies in order to achieve the above object. As a result, the inventors found that the above object can be achieved by producing a pigment dispersion composition by bringing a pigment (I) having a surface acidic group and a basic compound (II) having two or more amino groups selected from a primary amino group and a secondary amino group in its molecule, into contact with each other in an aqueous medium to prepare a pigment having an unreacted surface amino group, bringing the pigment into contact with a polyisocyanate polyurethane resin (III) having two or more isocyanate end groups so that the pigment and the polyisocyanate polyurethane resin are bonded via a urea bond to prepare a dispersion of a polyurethane resin-bonded pigment (A), and heating the dispersion of the polyurethane resin-bonded pigment (A) at 40 to 100° C. for 1 to 30 days. This finding has led to the completion of the invention.

One aspect of the invention provides the following.

(1) A method for producing a pigment dispersion composition including bringing a pigment (I) having a surface acidic group and a basic compound (II) having two or more amino groups selected from a primary amino group and a secondary amino group in its molecule, into contact with each other in an aqueous medium to prepare a pigment having an unreacted surface amino group, bringing the pigment into contact with a polyisocyanate polyurethane resin (III) having two or more isocyanate end groups so that the pigment and the polyisocyanate polyurethane resin are bonded via a urea bond to prepare a dispersion of a polyurethane resin-bonded pigment (A), and heating the dispersion of the polyurethane resin-bonded pigment (A) at 40 to 100° C. for 1 to 30 days.

(2) The method for producing a pigment dispersion composition according to (1), wherein the polyisocyanate polyurethane resin (III) having two or more isocyanate end groups has an acid number of 20 to 200 mg KOH/g on a solid basis.

(3) The method for producing a pigment dispersion composition according to (1) or (2), wherein the pigment (I) having a surface acidic group is self-dispersible carbon black having a surface acidic group. Note that the pigment (I) having a surface acidic group may be hereinafter referred to as "pigment (I)", the basic compound (II) having two or more amino groups selected from a primary amino group and a secondary amino group in its molecule may be hereinafter referred to as "basic compound (II)", and the polyisocyanate polyurethane resin (III) having an isocyanate end group may be hereinafter referred to as "polyisocyanate polyurethane resin (III)".

Advantageous Effects of the Invention

According to one aspect of the invention, the basic compound (II) having two or more amino groups selected from a primary amino group and a secondary amino group in its molecule can be ionically attracted to the pigment (I) having a surface acidic group by bringing the pigment (I) into contact with the basic compound (II) in the aqueous medium, and the dispersion of the polyurethane resin-bonded pigment (A) in which the unreacted surface amino group of the pigment and the polyisocyanate polyurethane resin (III) are bonded via a urea bond can be obtained by bringing the pigment into contact with the polyisocyanate polyurethane resin (III) having an isocyanate end group. A pigment dispersion composition that exhibits excellent image density, dispersibility, and storage stability, has high re-solubility, and forms an ink film that exhibits excellent marker resistance and scratch resistance, can be easily produced by heating (aging) the dispersion of the polyurethane resin-bonded pigment (A) at 40 to 100° C. for 1 to 30 days.

DESCRIPTION OF EMBODIMENTS

A method for producing a pigment dispersion composition according to one embodiment of the invention includes bringing a pigment (I) having a surface acidic group and a basic compound (II) having two or more amino groups selected from a primary amino group and a secondary amino group in its molecule, into contact with each other in an aqueous medium to prepare a pigment having an unreacted surface amino group, bringing the pigment into contact with a polyisocyanate polyurethane resin (III) having two or more isocyanate end groups so that the pigment and the polyisocyanate polyurethane resin are bonded via a urea bond to prepare a dispersion of a polyurethane resin-bonded pigment (A), and heating the dispersion of the polyurethane resin-bonded pigment (A) at 40 to 100° C. for 1 to 30 days.

The pigment (I) used for the method for producing a pigment dispersion composition according to one embodiment of the invention is preferably a pigment having an acidic surface. Examples of such a pigment include a pigment that has been subjected to surface acidification using a synergist, and a pigment that has been acidified by surface treatment, and neutralized with a counter ion.

A black pigment is preferable as the pigment (I) used for the method for producing a pigment dispersion composition according to one embodiment of the invention. Specific examples of the black pigment include ivory black, peach black, lamp black, mars black, bitumen, titanium black, carbon black, and the like. Among these, carbon black that exhibits excellent blackness and tinting strength when used as an inkjet recording black pigment may preferably be used. It is particularly preferable to use self-dispersible carbon black having a surface acidic group from the viewpoint of the dispersibility, discharge stability, and the like of the ink composition.

The term "self-dispersible carbon black pigment having a surface acidic group" used herein refers to a carbon black pigment that has a structure in which at least one hydrophilic group (e.g., acidic group) is bonded to the surface of the carbon black pigment either directly or via another atomic group, and can maintain a stably dispersed state without the addition of a surfactant or a polymer compound when suspended in water to prepare a dispersion, the dispersion of the carbon black pigment having a surface tension almost equal to that of water. The term "self-dispersible carbon black pigment" used herein includes a self-dispersible carbon black pigment in which the hydrophilic group (e.g., acidic group) is neutralized with a counter ion.

Examples of the carbon black include furnace black, channel black, acetylene black, thermal black, and the like. These carbon blacks have a high carbon content, exhibit high blackness due to an amorphous structure, have a high drying rate as compared with peach black, lamp black, and the like, exhibit high storage stability, and are inexpensive.

A pigment aqueous dispersion prepared using ultrafine carbon black (e.g., furnace black or channel black) exhibits high resolution and excellent print quality when used as an inkjet printer ink composition.

It is preferable to use carbon black having a specific surface area by nitrogen adsorption ($N_2SA$) of 50 $m^2/g$ or more, more preferably 50 to 300 $m^2/g$, and still more preferably 80 to 250 $m^2/g$. It is preferable to use carbon black having a DBP absorption of 50 $cm^3/100$ g or more, more preferably 50 to 200 $cm^3/100$ g, and still more preferably 80 to 180 $cm^3/100$ g.

If the $N_2SA$ and the DBP absorption of the carbon black are within the above ranges, the resulting pigment aqueous dispersion exhibits excellent dispersibility in an aqueous medium and excellent ink performance when used as an inkjet ink composition.

Note that the term "specific surface area by nitrogen adsorption ($N_2SA$)" used herein refers to a value measured in accordance with "Carbon black for rubber industry—Fundamental characteristics—Part 2: Determination of specific surface area—Nitrogen adsorption methods—Single-point procedures" specified in JIS K 6217-2, and the term "DBP absorption" used herein refers to a value measured in accordance with "Carbon black for rubber industry—Fundamental characteristics—Part 4: Determination of dibutylphthalate absorption number" specified in JIS K 6217-4.

The average particle size of the primary particles of the carbon black is preferably 10 to 300 nm, more preferably 15 to 270 nm, and still more preferably 20 to 250 nm.

Note that the term "average particle size" used herein in connection with the primary particles of the carbon black refers to the arithmetic mean value of the particle sizes of 2000 to 10,000 primary particles measured using an electron microscope having a resolution of 15 Å or more.

Specific examples of the carbon black include Tokablack #8500, Tokablack #8500F, Tokablack #7550SB, Tokablack #7550F (manufactured by Tokai Carbon Co., Ltd.); #650, #750, MA600, #44B, #44, #45B, MA7, MA11, #47, #45, #33, #45L, #47, #50, #52, MA77, MA8 (manufactured by Mitsubishi Chemical Corp.); FW200, FW2V, FW1, FW18PS, NIpex 180 IQ, FW1, Special Black 6, S160, S170 (manufactured by Degussa); Black Pearls 1000M, Black Pearls 800, Black Pearls 880, Monarch 1300, Monarch 700, Monarch 880, CRX 1444, Regal 330R, Regal 660R, Regal 660, Regal 415R, Regal 415, Black Pearls 4630, Monarch 4630 (manufactured by Cabot); Raven 7000, Raven 3500, Raven 5250, Raven 5750, Raven 5000 ULTRA II, HV 3396, Raven 1255, Raven 1250, Raven 1190, Raven 1000, Raven 1020, Raven 1035, Raven 1100 ULTRA, Raven 1170, Raven 1200 (manufactured by Columbian); DB1305 (manufactured by KOSCO); Sunblack 700, 705, 710, 715, 720, 725, 300, 305, 320, 325, X25, X45 (manufactured by Asahi Carbon Co., Ltd.); N220, N110, N234, N121 (manufactured by Sid Richardson); Niteron #300 (manufactured by Nippon Steel Chemical Carbon Co., Ltd.), Showblack N134, N110, N220, N234, N219 (manufactured by Cabot Japan K.K.); and the like.

The pigment (I) used for the method for producing a pigment dispersion composition according to one embodiment of the invention may be obtained by appropriately oxidizing the above pigment.

The oxidation treatment may be implemented by a known method (e.g., liquid-phase oxidation or gas-phase oxidation).

When implementing the oxidation treatment by liquid-phase oxidation, an oxidizing agent (e.g., hydrogen peroxide solution, nitric acid, sulfuric acid, chlorate, persulfate, or percarbonate) may be used. For example, a pigment such as carbon black may be added to an aqueous solution that contains the oxidizing agent, and the mixture may be stirred to obtain a pigment having a surface acidic group. An acidic group can be uniformly introduced into the surface of the pigment (e.g., carbon black) by controlling the amount of the oxidizing agent and the reaction temperature.

When implementing the oxidation treatment by gas-phase oxidation, ozone oxidation or air oxidation may be used. Gas-phase oxidation has advantages in that the drying cost is unnecessary, and the operation is easy as compared with liquid-phase oxidation, for example.

The acidic group that is to be introduced into the surface of the pigment by oxidation is not particularly limited as long as the acidic group can undergo an acid-base reaction with a basic compound having an amino group to form a salt. Examples of the acidic group include a carboxyl group, a sulfone group, and the like. The amount (number) of the acidic groups introduced into the surface of the pigment may be controlled by controlling the gas-phase oxidation conditions or the liquid-phase oxidation, conditions.

An example in which oxidized carbon black (i.e., a black pigment having a surface acidic group) is produced by liquid-phase oxidation is described below.

Carbon black, the oxidizing agent, and the aqueous medium (preferably deionized water) are mixed in a stirring tank in an appropriate quantitative ratio. The mixture is sufficiently stirred in the stirring tank at an appropriate temperature (e.g., room temperature to 90° C., and preferably 60 to 90° C.) so that the carbon black is oxidized to obtain an aqueous dispersion (slurry) of a surface-oxidized pigment (i.e., a carbon black aggregate (agglomerate) on which a hydrophilic functional group (e.g., carboxyl group or hydroxyl group) is formed).

The carbon black can be efficiently dispersed in the slurry, and an acidic group can be uniformly and effectively produced by subjecting the carbon black to wet or dry oxidation in advance. When using wet oxidation, it is preferable to oxidize the carbon black using ozone water, a hydrogen peroxide solution, a peroxo diacid, or a salt thereof. When using dry oxidation, it is preferable to oxidize the carbon black by exposing the carbon black to a gas such as ozone, oxygen, $NO_x$, or $SO_x$.

It is also preferable to use (add) a surfactant in order to uniformly disperse the surface-oxidized pigment in the slurry. An anionic surfactant, a nonionic surfactant, or a cationic surfactant may be used as the surfactant. Examples of the anionic surfactant include fatty acid salts, alkyl sulfate salts, alkylaryl sulfonate salts, and the like. Examples of the nonionic surfactant include polyoxyethylene alkyl ethers, polyoxyethylene alkyl aryl ethers, and the like. Examples of the cationic surfactant include alkylamine salts, quaternary ammonium salts, and the like.

The slurry of the surface-oxidized pigment thus obtained may be reacted directly with the basic compound, or the surface-oxidized pigment may be subjected to a partial neutralization treatment (i.e., a treatment that neutralizes some of the acidic groups (surface functional groups)) in order to suppress aggregation of the surface-oxidized pigment or an increase in viscosity.

When subjecting the surface-oxidized pigment to the partial neutralization treatment, it is preferable to remove reduced salts (i.e., a reduced product of the oxidizing agent) produced by the oxidation treatment in advance. The subsequent neutralization reaction proceeds efficiently as a result of removing reduced salts, so that re-aggregation of the surface-oxidized pigment can be suppressed due to improved dispersibility in water. It is preferable to remove the reduced salts using a separation membrane such as an ultrafiltration (UF) membrane, a reverse osmosis (RO) membrane, or an electrodialysis membrane.

It is preferable to subject the surface-oxidized pigment to the partial neutralization treatment by adding a neutralizer to the slurry, and heating the mixture. Examples of the neutralizer include, but are not limited to, alkali salts such as potassium hydroxide and sodium hydroxide, ammonia, and organic amines such as ethanolamine, triethanolamine, dimethylaminoethanol, and quaternary amines. The amount of the neutralizer added to the slurry is adjusted depending on the amount (number) of surface functional groups introduced into the pigment, but is preferably 50 to 100 mol % based on the amount of surface (acidic) functional groups. The pigment may be neutralized at room temperature. It is preferable to add the neutralizer to the slurry of the pigment contained in a stirring tank, and stir the mixture at 40 to 100° C. for 1 to 16 hours.

When a self-dispersible pigment (i.e., pigment (I)) is neutralized with a counter ion, the pigment particles are normally dispersed due to repulsion of the ions, and the storage stability can normally be improved when a polymer is added to the surface of the pigment. However, the dispersion stability may deteriorate when the surface of the pigment has a low acidic group concentration. In contrast, since the polyurethane resin-bonded pigment used in connection with one embodiment of the invention is produced by bonding the polyisocyanate polyurethane resin (III) having two or more isocyanate end groups to the pigment (I) via a urea bond, the polyurethane resin-bonded pigment exhibits excellent dispersibility and dispersion stability even if the surface of the pigment (I) has a low acidic group concentration.

It is preferable to remove undispersed aggregates and large particles present in the slurry of the pigment by centrifugation, filtration, or the like. The particle size distribution of the resulting aqueous pigment dispersion can be controlled by removing undispersed aggregates and large particles. This makes it possible to suppress clogging of a nozzle during printing when using the aqueous pigment dispersion as an inkjet printer ink composition.

When subjecting the pigment (slurry) to the neutralization treatment, it is preferable to remove salts (i.e., an oxide of the neutralizer) produced by the neutralization treatment. The dispersibility of the pigment in water can be improved by removing salts, so that re-aggregation of the surface-oxidized pigment can be suppressed. It is preferable to remove the salts using a separation membrane such as an ultrafiltration (UF) membrane, a reverse osmosis (RO) membrane, or an electrodialysis membrane.

When using carbon black having a surface acidic group as the pigment (I), it is preferable to use carbon black having a carboxyl group equivalent of 200 to 1200 µmol/g, more preferably 400 to 1000 µmol/g, and still more preferably 600 to 800 µmol/g.

The concentration of the pigment (I) in the slurry is preferably 3 to 30 mass %, more preferably 4 to 28 mass %, and still more preferably 5 to 25 mass %. When the concentration of the pigment (I) having a surface acidic group in the slurry is within the above range, the pigment can easily be reacted with the basic compound (II) having two or more amino groups selected from a primary amino group and a secondary amino group in its molecule by adding a given amount of the basic compound (II) to the slurry.

The pigment (I) having a surface acidic group can be obtained by the above method. Note that a commercially available product such as carbon black that exhibits relatively high dispersion stability (e.g., Aqua-Black (registered trademark) 162 or Aqua-Black (registered trademark) 164 (self-dispersible carbon black manufactured by Tokai Carbon Co., Ltd.)), or carbon black of which the surface has an acidic group concentration equal to or more than 50% and less than 100% of that of the self-dispersible carbon black, may also be used as the pigment having a surface acidic group. When using a commercially available product as the pigment having a surface acidic group, it is preferable to disperse the pigment in the aqueous medium before reacting the pigment with the basic compound having two or more amino groups selected from a primary amino group and a secondary amino group in its molecule. It is more preferable to disperse the pigment in the aqueous medium so that the concentration of the pigment in the aqueous medium is (almost) equal to the concentration of the pigment in the slurry (see above).

The average particle size of the pigment (I) having a surface acidic group is preferably 50 to 250 nm, more preferably 60 to 200 nm, and still more preferably 70 to 150 nm.

Note that the term "average particle size" used herein refers to a particle size at 50% (average particle size D50) in a cumulative volume particle size distribution measured using a laser diffraction particle size analyzer.

The basic compound (II) having two or more amino groups selected from a primary amino group and a secondary amino group in its molecule is not particularly limited as long as the basic compound (II) may undergo an acid-base reaction with the surface acidic group of the pigment, and may be bonded to the isocyanate end group of the polyisocyanate polyurethane resin (III) via a urea bond. Examples of the basic compound (II) include aliphatic polyamines such as ethylenediamine, diethylenetriamine, triethylenetetramine, tetraethylenepentamine, 1,3-propylenediamine, and hexamethylenediamine, aromatic polyamines such as phenylenediamine, diaminonaphthalene, and xylenediamine, alicyclic polyamines such as piperazine, N-aminoethylpiperazine, and isophoronediamine, and the like. These compounds may be used either alone or in combination as the basic compound (II).

In the method for producing a pigment dispersion composition according to one embodiment of the invention, the pigment (I) having a surface acidic group is brought into contact with the basic compound (II) having two or more amino groups selected from a primary amino group and a secondary amino group in its molecule in an aqueous medium to produce a pigment having an unreacted surface amino group.

The aqueous medium in which the pigment (I) having a surface acidic group is brought into contact with the basic compound (II) is preferably water. When using an aqueous medium other than water, it is preferable to use a solvent that is water-soluble and does not react with an amine and an isocyanate (e.g., ethers such as acetonitrile, tetrahydrofuran, ethylene glycol dimethyl ether, or diethylene glycol dimethyl ether). For example, a glycol-based aqueous solvent (e.g., ethylene glycol, propylene glycol, butylene glycol, diethylene glycol, triethylene glycol, or polyethylene glycol), dimethyl sulfoxide, sulfolane, or the like may be used. These aqueous media may be used in combination. Since a glycol-based aqueous solvent that includes an alcoholic hydroxyl group may react with the isocyanate end group of the polyurethane resin (III), it is preferable to add only a limited amount of a glycol-based aqueous solvent after reacting the pigment with the polyurethane resin.

The pigment having an unreacted surface amino group that is used as the material for forming the polyurethane resin-bonded pigment (A) is preferably prepared by bringing the pigment (I) having a surface acidic group into contact (reacting the pigment (I) having a surface acidic group) with the basic compound (II) having two or more amino groups selected from a primary amino group and a secondary amino group in its molecule by stirring the pigment (I) and the basic compound (II) in the aqueous medium at 20 to 60° C. for 0.5 to 10 hours.

It is preferable to react the basic compound (II) having two or more amino groups selected from a primary amino group and a secondary amino group so that the equivalent ratio of the amino groups of the basic compound (II) is 0.1 to 2 with respect to the isocyanate groups of the polyisocyanate polyurethane resin (III) having two or more isocyanate end groups (i.e., the ratio of the number of moles of the amino groups of the basic compound (II) to the number of moles of the isocyanate groups of the polyisocyanate polyurethane resin (III) is 0.1 to 2). The equivalent ratio is more preferably 0.2 to 1.8.

When the basic compound (II) having two or more amino groups selected from a primary amino group and a secondary amino group in its molecule is brought into contact with the pigment (I) having a surface acidic group in the aqueous medium, the basic compound (II) is ionically attracted to the surface acidic group of the pigment, and is present in the vicinity of the surface of the pigment (i.e., a pigment having an unreacted surface amino group is obtained).

In the method for producing a pigment dispersion composition according to one embodiment of the invention, the polyurethane resin-bonded pigment (A) is produced by bringing the polyisocyanate polyurethane resin (III) having two or more isocyanate end groups into contact with the pigment having an unreacted surface amino group so that the pigment and the polyisocyanate polyurethane resin are bonded via a urea bond.

The surface amino group of the pigment and the isocyanate group of the polyisocyanate polyurethane resin (III) react instantaneously to form a urea bond. Therefore, the polyisocyanate polyurethane resin (III) is crosslinked and elongated on the surface of the pigment, so that the polyisocyanate polyurethane resin (III) chemically bonds and physically adheres to the surface of the pigment. The surface of the pigment is thus covered with the polyisocyanate polyurethane resin (III) to obtain the polyurethane resin-bonded pigment (A).

The polyisocyanate polyurethane resin (III) having two or more isocyanate end groups is not particularly limited as long as the isocyanate end group can be bonded to the surface amino group of the pigment via a urea bond.

The polyisocyanate polyurethane resin (III) having two or more isocyanate end groups is preferably a polyurethane resin obtained by bonding a compound having a functional group or a molecular chain that can be dispersed in the aqueous medium and having two or more hydroxyl groups in its molecule to a polyisocyanate compound via a urethane bond, in order to subsequently react the polyurethane resin with the surface amino group of the carbon black.

The compound having a functional group or a molecular chain that can be dispersed in the aqueous medium and having two or more hydroxyl groups in its molecule is preferably a compound having a functional group that can form a salt that causes phase inversion of the polyurethane resin into the aqueous medium. Specific examples of such a compound include tertiary carboxyl group-containing polyol compounds.

Examples of the tertiary carboxyl group-containing polyol compounds include polyhydroxycarboxylic acids such as dimethylolpropionic acid, dimethylolbutanoic acid, dimethylolacetic acid, dimethylolbutyric acid, dimethylolvaleric acid, and dimethylolcaproic acid. Among these, dihydroxymonocarboxylic acids such as dimethylolpropionic acid and dimethylolbutanoic acid are preferable. Since the tertiary carboxyl group included in the above compounds has very low reactivity with an isocyanate compound, a urethane bond-forming reaction is not hindered, so that the target polyurethane resin can be efficiently produced.

The acid number of the polyurethane resin may be controlled by controlling the amount of the tertiary carboxyl group-containing polyol compound. The acid number of the polyurethane resin may be controlled using a diol compound that includes a nonionic molecular chain in addition to the tertiary carboxyl group-containing polyol compound. Examples of the diol compound having a nonionic molecular chain include polyalkylene glycol diols such as polyethylene glycol (PEG) diol, and a copolymer diol of polyethylene glycol (PEG) diol and polypropylene glycol (PPG) diol or polybutylene glycol (PBG) diol.

A polyol having at least two hydroxyl groups in its molecule may be used together with the tertiary carboxyl group-containing polyol compound and the diol compound having a nonionic molecular chain in an arbitrary ratio.

Examples of the polyol having at least two hydroxyl groups in the molecule include a side chain-modified diol that has been chemically modified depending on the application via the Michael addition reaction or the like. The balance between the hydrophilicity and the hydrophobicity of the resulting polyurethane resin (III) can be designed in various ways by introducing a hydrophobic group or a hydrophilic group into the side chain of the diol (polyol).

The side chain-modified diol may be synthesized by subjecting a dialkanolamine and a (meth)acrylic acid derivative to an addition reaction. The Michael addition reaction or the like can be easily controlled when using an acrylic acid derivative that reacts with the dialkanolamine at a low temperature (i.e., exhibits high reactivity) as compared with a methacrylic acid derivative. Examples of the dialkanolamine include dihydroxyalkyl-substituted derivatives of a secondary amine such as diethanolamine, dipropanolamine, and diisopropanolamine. Examples of the (meth)acrylic acid derivative include, but are not limited to, alkyl (meth)acrylates, cycloalkyl (meth)acrylates, aromatic (meth)acrylates, halogenated alkyl (meth)acrylates, (meth)acrylates, aromatic vinyl compounds, vinyl cyanide compounds, unsaturated dibasic acids, and derivatives thereof.

Examples of the alkyl (meth)acrylates include methyl (meth)acrylate, ethyl (meth)acrylate, butyl (meth)acrylate, 2-ethylhexyl (meth)acrylate, and the like.

Examples of the cycloalkyl (meth)acrylates include cyclohexyl (meth)acrylate, methylcyclohexyl (meth)acrylate, bornyl (meth)acrylate, isobornyl (meth)acrylate, adamantyl (meth)acrylate, and the like.

Examples of the aromatic (meth)acrylates include phenyl (meth)acrylate, benzyl (meth)acrylate, and the like.

Examples of the halogenated alkyl (meth)acrylates include fluoromethyl (meth)acrylate, fluoroethyl (meth)acrylate, and the like.

Examples of the (meth)acrylates include hydroxyalkyl (meth)acrylates, glycidyl (meth)acrylate, ethylene glycol (meth)acrylate, polyethylene glycol (meth)acrylate, and the like.

Examples of the aromatic vinyl compounds include styrene, α-substituted styrenes such as α-methylstyrene and α-ethylstyrene, nucleus-substituted styrenes such as fluorostyrene and methylstyrene, and the like.

Examples of the (meth)acrylic acid derivatives include aliphatic monoacrylates such as 2-ethylhexyl (meth)acrylate, lauryl (meth)acrylate, and stearyl (meth)acrylate; alicyclic monoacrylates such as cyclohexyl (meth)acrylate, dicyclopentanyl (metha)acrylate, and isobornyl (meth)acrylate; aromatic monoacrylates such as benzyl (meth)acrylate, phenyl (meth)acrylate, phenoxyethyl (meth)acrylate, phenoxy diethylene glycol (meth)acrylate, phenoxy tetraethylene glycol (meth)acrylate, nonylphenoxyethyl (meth)acrylate, and nonylphenoxy tetraethylene glycol (meth)acrylate; alkyl ether acrylates such as methoxy diethylene glycol (meth)acrylate, ethoxy diethylene glycol (meth)acrylate, butoxyethyl (meth)acrylate, butoxy triethylene glycol (meth)acrylate, and methoxy dipropylene glycol (meth)acrylate; mono(meth)acryloyloxy dibasic acid esters such as 2-(meth)acryloyloxyethyl hydrogen succinate, 2-(meth)acryloyloxyethyl hydrogen hexahydrophthalate, 2-(meth)acryloyloxyethyl hydrogen phthalate, and 2-(meth)acryloyl oxypropyl hydrogen phthalate; monoalkyl ether polyoxyalkylene glycol (meth)acrylates such as mono(2-ethylhexyl)ether polyoxyethylene glycol (meth)acrylate, mono(nonylphenyl)ether polyoxyethylene glycol (meth)acrylate, mono(2-ethylhexyl)

ether polyoxypropylene glycol (meth)acrylate, and mono(n-onylphenyl)ether polyoxypropylene glycol (meth)acrylate; monoacrylates including a polyoxyethylene ether bond, such as polyethylene glycol mono(meth)acrylate and polypropylene glycol mono(meth)acrylate; hydroxyl group-containing mono(meth)acrylates such as 2-hydroxyethyl (meth)acrylate, 2-hydroxypropyl (meth)acrylate, glycerol mono(meth)acrylate, 2-hydroxy-3-butoxypropyl (meth)acrylate, 2-hydroxy-3-phenoxypropyl (meth)acrylate, and an ε-caprolactone adduct of 2-hydroxyethyl (meth)acrylate; alicyclic ether (meth)acrylates such as glycidyl (meth)acrylate and tetrahydrofurfuryl (meth)acrylate; nitrogen-containing monoacrylates such as N,N-dimethylaminoethyl (meth)acrylate, N,N-diethylaminoethyl (meth)acrylate, morpholino (meth)acrylate, N,N-dimethylacrylamide, dimethylaminopropyl acrylate, and N-isopropylacrylamide; polyoxyalkylene phosphate mono(meth)acrylates such as polyoxyethylene phosphate mono(meth)acrylate and polyoxypropylene phosphate mono(meth)acrylate; and the like.

Examples of the polyol having at least two hydroxyl groups in its molecule include diols such as ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, and cyclohexyldimethanol, and high-molecular-weight polyols.

Examples of the high-molecular-weight polyols include polyester polyols such as a polyester diol, high-molecular-weight diols such as a polycarbonatediol, a polylactonediol, and a polybutadienediol, polyether polyols, and the like. Further examples of the high-molecular-weight polyols include polymer diols of a compound that includes a rosin skeleton or a hydrogenated rosin skeleton. It is preferable to use a high-molecular-weight polyol having a number average molecular weight of 300 to 5000, and more preferably 500 to 3000.

Examples of the polyester polyols include a polyester polyol obtained by condensation of one or two or more of a polyol and a polyol generic component and one or two or more of a polybasic acid and an anhydride thereof.

Examples of the polyol used as the raw material for producing the polyester polyol include ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexanedimethanol, bisphenol A, bisphenol F, hydrogenated bisphenol A, hydrogenated bisphenol F, a castor oil-modified diol, a castor oil-modified polyol, and the like.

Examples of the polyol generic component used as the raw material for producing the polyester polyol include alkyl monoglycidyl ethers such as butyl glycidyl ether, 2-ethylhexyl glycidyl ether, lauryl glycidyl ether, decyl glycidyl ether, and stearyl glycidyl ether, and monoepoxy compounds such as an alkyl glycidyl ester ("Cardura E10" manufactured by Shell Japan).

Examples of the polybasic acid and an anhydride thereof used as the raw material for producing the polyester polyol include aliphatic dibasic acids such as succinic acid, adipic acid, azelaic acid, sebacic acid, and a dimer acid, anhydrides thereof, aromatic polybasic acids and anhydrides thereof such as dodecenylsuccinic anhydride, phthalic anhydride, isophthalic acid, terephthalic acid, and trimellitic anhydride, alicyclic polybasic acids and anhydrides thereof such as hydrophthalic anhydride and dimethyl-1,4-cyclohexanedicarboxylic acid, and the like.

Examples of a polylactonediol include a polylactonediol obtained by ring-opening addition polymerization of a hydroxyl-terminated compound (e.g., polyol or polyester polyol) and a monomer that includes a lactone ring (e.g., ε-caprolactone or β-methyl-δ-valerolactone).

Examples of a polycarbonatediol include a polycarbonatediol obtained using a diol such as 1,4-butanediol, 1,6-hexanediol, 3-methyl-1,5-pentanediol, 2-ethyl-1,3-hexanediol, 2-butyl-2-ethyl-1,3-propanediol, 1,9-nonanediol, or 2-methyl-1,8-octanediol as a raw material.

Examples of the polybutadienediol include a polybutadienediol shown by the following formula ("Poly bd R-15HT" and "Poly bd R-45HT" (manufactured by Idemnitsu Kosan Co., Ltd.)), a polyisoprenediol ("Poly ip" manufactured by Idemitsu Kosan Co., Ltd.), an α,ω-polybutadiene glycol ("G-1000", "G-2000", and "G-3000" manufactured by Nippon Soda Co., Ltd.), and the like.

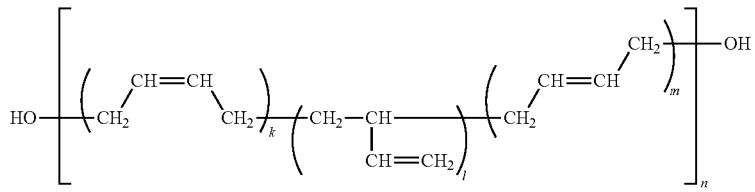

wherein k=0.2, l=0.2, m=0.6, and n is a positive integer.

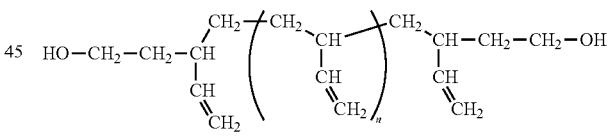

wherein n is a positive integer.

Examples of the polyether polyol include a polyether polyol obtained by adding propylene oxide, tetrahydrofuran, or butylene oxide to a polyalkylene glycol (e.g., polyethylene glycol (PEG) diol, polypropylene glycol (PPG) diol, or polybutylene glycol (PBG) diol), bisphenol A, bisphenol F, hydrogenated bisphenol A, hydrogenated bisphenol F, or the like.

Examples of the polymer diols of a compound that includes a rosin skeleton or a hydrogenated rosin skeleton include Pine Crystal D-6011 and Pine Crystal D-6240 (manufactured by Arakawa Chemical Industries, Ltd.).

The polyisocyanate compound is not particularly limited as long as the polyisocyanate compound includes two or more isocyanate groups in its molecule. A diisocyanate compound or a polyisocyanate compound having three or more isocyanate groups may be used depending on the application.

Examples of the diisocyanate compound include diphenylmethane diisocyanate (hereinafter referred to as "MDI"), a polyphenylenepolymethylene polyisocyanate, tolylene diisocyanate (hereinafter referred to as "TDI"), xylylene diisocyanate, tetramethylxylylene diisocyanate, isophorone diisocyanate (hereinafter referred to as "IPDI"), hexamethylene diisocyanate (hereinafter referred to as "HDI"), tetramethylene diisocyanate, dodecamethylene diisocyanate, trimethylhexamethylene diisocyanate, 1,3-cyclohexylene diisocyanate, naphthalene diisocyanate, hydrogenated diphenylmethane diisocyanate, hydrogenated xylylene diisocyanate, a compound obtained by substituting some of the isocyanate groups of an isocyanate group-containing compound with a biuret group, an allophanate group, a carbodiimide group, a uretonimine group, an oxazolidone group, an amide group, an imide group, an isocyanurate group, or a urethodione group, and the like. These compounds may be used either alone or in combination.

When the isocyanate group of the polyisocyanate polyurethane resin (III) having two or more isocyanate end groups reacts with the basic compound (II) that has two or more amino groups in its molecule and is present on the surface of the pigment (I) that is dispersed in water, a competing reaction of the amino group and water occurs.

Therefore, a nonaromatic diisocyanate compound that has a low rate of reaction with water as compared with an aromatic diisocyanate compound (e.g., MDI or TDI) is preferable as the diisocyanate compound for producing the polyisocyanate polyurethane resin (III). In particular, the basic compound (II) having two or more amino groups in its molecule and the polyisocyanate polyurethane resin (III) react preferentially when using an alicyclic diisocyanate compound (e.g., IPDI or hydrogenated MDI) or an aliphatic diisocyanate (e.g., 1,6-hexamethylene diisocyanate) at the molecular end. When the reaction temperature is set to 50° C. or less (preferably 25 to 40° C.), the difference in rate of reaction increases, and the basic compound (II) and the polyisocyanate polyurethane resin (III) react preferentially.

When producing the polyisocyanate polyurethane resin (III) having two or more isocyanate end groups by bonding a polyol compound having at least two hydroxyl groups in its molecule, a diisocyanate compound, and a polyisocyanate via a urethane bond, a polyurethane resin having an isocyanate group at each end can be obtained by reacting the compounds so that the number of equivalents of the isocyanate groups of the diisocyanate compound is larger than the number of equivalents of the hydroxyl groups of the polyol compound having at least two hydroxyl groups in its molecule by 2. For example, when using a diol compound as the polyol compound having at least two hydroxyl groups in its molecule, the number of moles of the diisocyanate compound is set to be larger than that of the diol compound by 1.

A polymer having an isocyanate end group may be accurately obtained (i.e., a polyurethane resin that exhibits a small variation in molecular weight distribution may be obtained) by synthesizing an isocyanate-terminated oligomer stepwise (i.e., increasing the molecular weight stepwise).

When producing the polyurethane resin by reacting a compound having two hydroxyl groups in the molecule with a diisocyanate compound, a polyurethane having an isocyanate end group may be synthesized by reacting the diol compound and the diisocyanate compound in an organic solvent so that the total number of moles of the diisocyanate compound is "n+1" when the total number of moles of the diol compound is referred to as "n".

It is preferable that the polyisocyanate polyurethane resin (III) have an acid number of 20 to 200 mg KOH/g, more preferably 25 to 150 mg KOH/g, and still more preferably 30 to 120 mg KOH/g, so that the polyisocyanate polyurethane resin (III) can be dispersed in water.

The acid number may be adjusted by adjusting the number of moles of a tertiary carboxyl group-containing diol compound.

When using a tertiary carboxyl group-containing diol compound as the polyol compound having a functional group or a molecular chain that can be dispersed in the aqueous medium and having two or more hydroxyl groups in its molecule, and using a diisocyanate compound as the polyisocyanate compound, the acid number (AN) of the polyisocyanate polyurethane resin (III) is calculated by the following expression.

$$AN = \frac{a1 \cdot 56.11 \cdot 10^3}{\sum_{n=1}^{n} an \cdot An + \sum_{n=1}^{n} bn \cdot Bn}$$

where, a1 is the number of moles of the tertiary carboxyl group-containing diol compound (e.g., dimethylolpropionic acid), A1 is the molecular weight of the tertiary carboxyl group-containing diol compound (e.g., dimethylolpropionic acid), an is the number of moles of an additional diol, An is the molecular weight of the additional diol, bn is the number of moles of the diisocyanate compound, and Bn is the molecular weight of the diisocyanate compound.

When using a diol compound as the polyol, and using a diisocyanate compound as the polyisocyanate compound, the number average molecular weight of the polyisocyanate polyurethane resin (III) is calculated (adjusted) by the following expression.

$$\text{Number average molecular weight} = nA' + (n+1)B'$$

where, n is the total number of moles of the polyol, A' is the number average molecular weight of the polyol, and B' is the number average molecular weight of the diisocyanate compound.

The number average molecular weight of the polyisocyanate polyurethane resin (III) calculated by the above expression is preferably 1000 to 15,000, more preferably 1300 to 10,000, and still more preferably 1600 to 8000. It is preferable that the polyisocyanate polyurethane resin (III) have an acid number of 20 to 200 mg KOH/g, more preferably 25 to 150 mg KOH/g, and still more preferably 30 to 120 mg KOH/g, so that the polyisocyanate polyurethane resin (III) can be dispersed in water.

When producing the polyurethane resin using a trifunctional or higher functional polyol and the polyisocyanate compound, it is desirable to prevent gelation by adjusting the molar fraction in accordance with Flory's equation or the like.

When producing the polyisocyanate polyurethane resin (III), the polyol and the polyisocyanate compound are preferably reacted at 60 to 80° C. in order to suppress side reactions. The polyol and the polyisocyanate compound may be reacted without using a solvent, or may be reacted using an arbitrary organic solvent (e.g., ethyl acetate, methyl ethyl ketone, or acetonitrile) that is normally used for a urethane reaction. An arbitrary urethane reaction catalyst such as a tertiary amine-based catalyst, dibutyltin laurate, or tin(II) octylate may be used when reacting the polyol and the polyisocyanate compound. Note that the urethane reaction catalyst need not necessarily be used.

When producing the polyurethane resin having an isocyanate end group using a tertiary carboxyl group-containing polyol compound or the like, it is preferable to appropriately add a tertiary amine such as triethylamine, trimethylamine, N-methylmorpholine, tributylamine, N-methylpyrazine, or methylidazole during phase inversion of the polyurethane resin into the aqueous medium.

When bringing the pigment having an unreacted surface amino group into contact with the polyisocyanate polyurethane resin (III) having two or more isocyanate end groups so that the pigment and the polyisocyanate polyurethane resin are bonded via a urea bond, the polyisocyanate polyurethane resin (III) is preferably used (added) in an amount of 2 to 200 parts by mass, and more preferably 10 to 100 parts by mass, based on 100 parts by mass of the pigment having an unreacted surface amino group. If the amount of the polyisocyanate polyurethane resin (III) is less than 2 parts by mass, the image density may not be improved. If the amount of the polyisocyanate polyurethane resin (II) exceeds 200 parts by mass, the image density and the storage stability may deteriorate due to too large an amount of the polyisocyanate polyurethane resin (III).

The isocyanate group of the polyisocyanate polyurethane resin (III) is preferably reacted with the pigment having an unreacted surface amino group at 50° C. or less, and more preferably 25 to 40° C. Since a difference in rate of reaction occurs when the reaction temperature is within the above range, the unreacted surface amino group of the pigment and the polyisocyanate polyurethane resin (III) react preferentially as compared with a reaction (i.e., side reaction) between the polyisocyanate polyurethane resin (III) and the aqueous medium.

The polyurethane resin that functions as a dispersant can be physically and chemically bonded to the surface of the pigment by thus reacting the unreacted surface amino group of the pigment with the isocyanate end group of the polyurethane resin to form a urea bond.

It is preferable that the polyurethane resin-bonded pigment (A) obtained by bringing the pigment (I) and the basic compound (II) into contact with each other in the aqueous medium to prepare a pigment having an unreacted surface amino group, and bringing the pigment into contact with the polyisocyanate polyurethane resin (III) so that the pigment and the polyisocyanate polyurethane resin are bonded via a urea bond, include the polyisocyanate polyurethane resin (III) in an amount of 5 to 150 parts by mass, more preferably 6 to 120 parts by mass, and still more preferably 7 to 100 parts by mass, based on 100 parts by mass of the pigment (I).

In the method for producing a pigment dispersion composition according to one embodiment of the invention, the solid content in the dispersion of the polyurethane resin-bonded pigment (A) obtained by bringing the pigment (I) and the basic compound (II) into contact with each other in the aqueous medium to prepare a pigment having an unreacted surface amino group, and bringing the pigment into contact with the polyisocyanate polyurethane resin (III) so that the pigment and the polyisocyanate polyurethane resin are bonded via a urea bond, may be adjusted by appropriately removing the solvent or adjusting the content of the aqueous medium.

In the method for producing a pigment dispersion composition according to one embodiment of the invention, the dispersion of the polyurethane resin-bonded pigment (A) is heated at 40 to 100° C. for 1 to 30 days.

The heating temperature is preferably 40 to 90° C., and more preferably 50 to 80° C. The heating time is preferably 2 to 15 days, and more preferably 3 to 10 days.

It is preferable to heat the dispersion of the polyurethane resin-bonded pigment (A) by allowing an airtight container that contains the dispersion of the polyurethane resin-bonded pigment (A) to stand in a thermostat bath.

In the method for producing a pigment dispersion composition according to one embodiment of the invention, it is preferable that the polyurethane resin-bonded pigment (A) included in the dispersion subjected to the heat treatment include the polyisocyanate polyurethane resin (III) in an amount of 5 to 150 parts by mass, more preferably 6 to 120 parts by mass, and still more preferably 7 to 100 parts by mass, based on 100 parts by mass of the pigment (I). It is preferable that the polyurethane resin-bonded pigment (A) included in the dispersion subjected to the heat treatment include the pigment (I) in a ratio of 3 to 20 mass %, and more preferably 7 to 15 mass %.

It is conjectured that the particles of the polyurethane resin-bonded pigment (A) included in the dispersion have a spherical shape having a small surface area due to aging during the heat treatment, and the viscosity of the dispersion decreases due to a decrease in inter-particle interaction. Specifically, it is conjectured that the particles of the polyurethane resin-bonded pigment (A) included in the dispersion rarely show a change in particle size and viscosity (i.e., become stable) due to the heat treatment, so that the storage stability of the dispersion is improved.

In the method for producing a pigment dispersion composition according to one embodiment of the invention, an additive may be added to the dispersion of the polyurethane resin-bonded pigment (A) that is not subjected to the heat treatment or the dispersion of the polyurethane resin-bonded pigment (A) that has been subjected to the heat treatment. Examples of the additive include one or more components selected from a moisturizer, a preservative, an emulsifier, a pH-adjusting agent, an anti-foaming agent, a smoothing agent, a water-dispersible resin, an aqueous wax dispersion, a resin emulsion, and the like.

The moisturizer may be one or more compounds selected from polyoxyalkylene ether glycols (e.g., glycerol, diethylene glycol, triethylene glycol, and dipropylene glycol), monoalkyl ethers and dialkyl ethers of polyoxyalkylene ether glycols, and the like.

The additive may be added to the dispersion of the polyurethane resin-bonded pigment (A) that is not subjected to the heat treatment and is contained in a stirring container while stirring the dispersion.

After heating the dispersion of the polyurethane resin-bonded pigment (A) to which the additive is added or is not added, a moisturizer, a preservative, an emulsifier, a pH-adjusting agent, an anti-foaming agent, a smoothing agent, a water-dispersible resin, an aqueous wax dispersion, a resin emulsion, and the like may optionally be added to the dispersion, and the dispersion may be stirred to obtain an ink composition, a paint composition, or the like.

When adding the additive, it is preferable to optionally adjust the pigment concentration and the viscosity by adding water or a water-soluble organic solvent. It is preferable to optionally filter the dispersion by a known method.

The desired pigment dispersion composition can thus be obtained by the method for producing a pigment dispersion composition according to one embodiment of the invention.

The pigment concentration (i.e., the mass ratio of the pigment (I)) in the pigment dispersion composition obtained by the method for producing a pigment dispersion composition according to one embodiment of the invention may be appropriately selected depending on the type of the pigment and the application of the pigment dispersion composition. The pigment concentration is normally adjusted to 2 to 25 mass %. When using the pigment dispersion composition as an inkjet ink composition utilizing a carbon black pigment, for example, the pigment concentration may be adjusted to 2 to 15 mass %.

The pigment dispersion composition obtained by the method for producing a pigment dispersion composition according to one embodiment of the invention may be used as a preliminary composition for an ink composition such as an aqueous gravure ink composition, an offset printing aqueous liquid ink composition, or an aqueous inkjet ink composition. When the pigment dispersion composition includes a specific amount of additives, the pigment dispersion composition may be used as an ink composition such as an aqueous gravure ink composition, an offset printing aqueous liquid ink composition, or an aqueous inkjet ink composition.

According to the embodiments of the invention, the basic compound (II) having two or more amino groups selected from a primary amino group and a secondary amino group in its molecule can be ionically attracted to the pigment (I) having a surface acidic group by bringing the pigment (I) into contact with the basic compound (II) in the aqueous medium, and the dispersion of the polyurethane resin-bonded pigment (A) in which the unreacted surface amino group of the pigment and the polyisocyanate polyurethane resin (III) are bonded via a urea bond can be obtained by bringing the pigment into contact with the polyisocyanate polyurethane resin (III) having an isocyanate end group. A pigment dispersion composition that exhibits excellent image density, dispersibility, and storage stability, has high re-solubility, and forms an ink film that exhibits excellent marker resistance and scratch resistance, can be easily produced by heating (aging) the dispersion of the polyurethane resin-bonded pigment (A) at 40 to 100° C. for 1 to 30 days.

The invention is further described below by way of examples. Note that the invention is not limited to the following examples.

EXAMPLES

The invention is further described below by way of examples and comparative examples. Note that the invention is not limited to the following examples.

Example 1

Preparation of Preliminary Composition for Inkjet Ink Composition (1) Production of Polyisocyanate Polyurethane Resin (III) Having Two or More Isocyanate End Groups A flask equipped with a stirring rod, a dry nitrogen supply tube, and a condenser was charged with 190 parts by mass of N,N'-diethanolamine and 810 parts by mass of Light Acrylate NP-4EA (nonylphenyl tetraethylene ether glycol acrylate) (manufactured by Kyoeisha Chemical Co., Ltd.). The mixture was reacted at 80° C. for 7 hours to obtain a diol having a nonylphenyl side chain (hereinafter referred to as "diol LKG-1"). The quotient of tertiary amine number/total amine number of the reaction product was 0.98 or more.

A flask equipped with a stirring rod, a nitrogen gas supply tube, and an Allihn condenser was charged with 400 parts by mass of methyl ethyl ketone (MEK), 60.4 parts by mass (2.6 mol) of dimethylolbutanoic acid, 96.1 parts by mass (0.8 mol) of a castor oil-modified diol ("HS-2G-160R" manufactured by Hokoku Co., Ltd.), 129.7 parts by mass (0.4 mol) of a polyester diol ("Kuraray Polyol P-2050" manufactured by Kuraray Ltd., number average molecular weight: 2066), 104.5 parts by mass (1.2 mol) of the diol LKG-1, and 209.3 parts by mass (6 mol) of isophorone diisocyanate. The mixture was reacted at 65° C. for 7 hours. The isocyanate group concentration in the reaction mixture was 1.35 mass %, and the acid number was 38 mg KOH/g on a solid basis.

The reaction mixture was then cooled to 35° C. After the addition of 41.2 parts by mass of triethylamine, the mixture was stirred for 30 minutes to obtain an isocyanate-terminated waterborne polyurethane resin (nonvolatile (solid) content: 58 wt %, Gardner bubble viscosity: J to K, GPC number average molecular weight: 1790, weight average molecular weight: 5550, ratio (number of moles of OH groups/number of moles of NCO groups) of number of moles of OH groups to number of moles of NCO groups: 5/6).

(2) Production of Dispersion of Polyurethane Resin-Bonded Pigment (A)

41.3 g of a 5% aqueous solution of piperazine.6$H_2O$ (Mw=194) (basic compound (II)) was added to 1 kg of Aqua-Black (registered trademark) 162 (manufactured by Tokai Carbon Co., Ltd., solid content: 19.2 mass %, carboxyl group equivalent: 800 μmol/g, carbon black having a surface acidic group) (pigment (I)). The mixture was stirred at room temperature for 30 minutes. After the addition of 66.2 g of the isocyanate-terminated waterborne polyurethane resin (solid content: 58.0 mass %) (polyisocyanate polyurethane resin (III)) obtained in (1), the mixture was stirred at room temperature for 3 hours, and then stirred at 40° C. for 1 hour.

The reaction solvent (MEK) was then evaporated by distillation under reduced pressure to obtain an aqueous dispersion of a polyurethane resin-bonded carbon black pigment (solid content: 24 mass %). The ratio of the content of the pigment (I) (carbon black) to the total solid content (polyurethane resin-bonded carbon black pigment) in the aqueous dispersion was 20 mass %. The mass ratio (carbon black/polyurethane resin) of the carbon black having a surface acidic group to the polyurethane resin in the polyurethane resin-bonded carbon black pigment included in the aqueous dispersion was 100/20 (on a solid basis).

(3) Preparation of Inkjet Ink Preliminary Composition

An airtight glass container was charged with the aqueous dispersion of the polyurethane resin-bonded carbon black pigment produced as described above, and allowed to stand at 40° C. for 15 days in a thermostat bath to obtain the target preliminary composition for an inkjet ink composition (hereinafter appropriately referred to as "preliminary composition 1").

Example 2

Preparation of Preliminary Composition for Inkjet Ink Composition

A preliminary composition for an inkjet ink composition (hereinafter appropriately referred to as "preliminary composition 2") was obtained in the same manner as in Example 1, except that the aqueous dispersion of the polyurethane resin-bonded carbon black pigment was heated in (3) by allowing the airtight glass container to stand at 60° C. for 7 days in a thermostat bath instead of allowing the airtight glass container to stand at 40° C. for 15 days in a thermostat bath.

Example 3

Preparation of Preliminary Composition for Inkjet Ink Composition

A preliminary composition for an inkjet ink composition (hereinafter appropriately referred to as "preliminary composition 3") was obtained in the same manner as in Example 1, except that the aqueous dispersion of the polyurethane resin-bonded carbon black pigment was heated in (3) by allowing the airtight glass container to stand at 80° C. for 3 days in a thermostat bath instead of allowing the airtight glass container to stand at 40° C. for 15 days in a thermostat bath.

Comparative Example 1

Preparation of Comparative Preliminary Composition for Inkjet Ink Composition

An aqueous dispersion of a polyurethane resin-bonded carbon black pigment (solid content: 24 mass %) was obtained in the same manner as in Example 1 (see (1) and (2)) to obtain a comparative preliminary composition for an inkjet ink composition (hereinafter appropriately referred to as "comparative preliminary composition 1") (i.e., the aqueous dispersion was not heated).

Comparative Example 2

Preparation of Comparative Preliminary Composition for Inkjet Ink Composition

A stirring container was charged with Aqua-Black (registered trademark) 162 (manufactured by Tokai Carbon Co., Ltd., solid content: 19.8 mass %, carboxyl group equivalent: 800 μmol/g (carbon black having a surface acidic group) and a waterborne polyurethane resin "FHydran AP-40N" (manufactured by DIC Corporation, solid content: 35.0 mass %) so that the mass ratio (carbon black/polyurethane resin) of the carbon black having a surface acidic group to the waterborne polyurethane resin was 100/20 on a solid basis. The mixture was stirred for 1 hour or more.

Water was then evaporated by distillation under reduced pressure to obtain an aqueous dispersion of a waterborne resin-bonded carbon black pigment (solid content: 24 mass %). The aqueous dispersion was used as a comparative preliminary composition for an inkjet ink composition (hereinafter appropriately referred to as "comparative preliminary composition 2"). The ratio of the content of the carbon black to the total solid content (waterborne resin-bonded carbon black pigment) in the aqueous dispersion was 20 mass %.

Comparative Example 3

Preparation of Comparative Preliminary Composition for Inkjet Ink Composition

A comparative pigment dispersion composition 2 was obtained in the same manner as in Comparative Example 2. An airtight glass container was charged with the comparative pigment dispersion composition 2, and allowed to stand at 40° C. for 15 days in a thermostat bath to obtain a comparative preliminary composition for an inkjet ink composition (hereinafter appropriately referred to as "comparative preliminary composition 3").

Comparative Example 4

Preparation of Comparative Preliminary Composition for Inkjet Ink Composition

A comparative pigment dispersion composition 2 was obtained in the same manner as in Comparative Example 2. An airtight glass container was charged with the comparative pigment dispersion composition 2, and allowed to stand at 60° C. for 7 days in a thermostat bath to obtain a comparative preliminary composition for an inkjet ink composition (hereinafter appropriately referred to as "comparative preliminary composition 4").

Comparative Example 5

Preparation of Comparative Preliminary Composition for Inkjet Ink Composition

A comparative pigment dispersion composition 2 was obtained in the same manner as in Comparative Example 2. An airtight glass container was charged with the comparative pigment dispersion composition 2, and allowed to stand at 80° C. for 3 days in a thermostat bath to obtain a comparative preliminary composition for an inkjet ink composition (hereinafter appropriately referred to as "comparative preliminary composition 5").

The storage stability of the preliminary compositions 1 to 3 obtained in Examples 1 to 3 and the comparative preliminary compositions 1 to 5 obtained in Comparative Examples 1 to 5 was evaluated as described below. The results are shown in Tables 1 and 2.

Evaluation of Storage Stability

The preliminary composition or the comparative preliminary composition was put in an airtight glass bottle, and stored at 70° C. for 3 to 4 weeks in an incubator. The particle size (nm) and the viscosity (mPa·s) were measured before and after the test, and the storage stability was evaluated in accordance with the following standard.

Excellent: The change ratio was within the range of −5% to +5% during 4 weeks of the test.

Good: The change ratio was within the range of −5% to +5% during 3 weeks of the test.

Fair: The change ratio was outside the range of −5% to +5%, but was within the range of −10% to +10% when 3 weeks had elapsed.

Poor: The change ratio was outside the range of −10% to +10% when 3 weeks had elapsed.

TABLE 1

|  |  | Example 1 | Example 2 | Example 3 |
|---|---|---|---|---|
| Heat treatment (temperature/time) |  | 40° C./15 days | 60° C./7 days | 80° C./3 days |
| Storage stability | Particle size | Excellent | Excellent | Excellent |
|  | Viscosity | Excellent | Excellent | Excellent |

TABLE 2

|  | Comparative Example 1 | Comparative Example 2 | Comparative Example 3 | Comparative Example 4 | Comparative Example 5 |
|---|---|---|---|---|---|
| Heat treatment (temperature/time) | — | — | 40° C./15 days | 60° C./7 days | 80° C./3 days |

TABLE 2-continued

|  |  | Comparative Example 1 | Comparative Example 2 | Comparative Example 3 | Comparative Example 4 | Comparative Example 5 |
|---|---|---|---|---|---|---|
| Storage stability | Particle size | Poor | Fair | Poor | Poor | Poor |
|  | Viscosity | Poor | Poor | Poor | Poor | Poor |

Example 4

Preparation of Inkjet Ink Composition

A stirring container was charged with 40 parts by mass of the preliminary composition 1 obtained in Example 1, 10 parts by mass of glycerol, 1 part by mass of a surfactant ("Surfynol 104E" manufactured by Air Products Japan, Inc.), 1 part by mass of an amine compound (triethanolamine), and 58 parts by mass of ion-exchanged water. The mixture was stirred for 1 hour or more to obtain an inkjet ink composition 1 (pigment concentration: 8 mass %).

Examples 5 and 6

Preparation of Inkjet Ink Composition

Inkjet ink compositions 2 and 3 (pigment concentration: 8 mass %) were obtained in the same manner as in Example 4, except that the preliminary compositions 2 and 3 obtained in Examples 2 and 3 were respectively used instead of the preliminary composition 1 obtained in Example 1.

Comparative Examples 6 to 10

Preparation of Comparative Inkjet Ink Composition

Comparative inkjet ink compositions 1 to 5 (pigment concentration: 8 mass %) were obtained in the same manner as in Example 4, except that the comparative preliminary compositions 1 to 5 obtained in Comparative Examples 1 to 5 were respectively used instead of the preliminary composition 1 obtained in Example 1.

The storage stability of the inkjet ink compositions 1 to 3 obtained in Examples 4 to 6 and the comparative inkjet ink compositions 1 to 5 obtained in Comparative Examples 6 to 10 was evaluated in the same manner as described above. The results are shown in Tables 3 and 4.

The image density, the re-solubility, and the marker resistance of the inkjet ink compositions 1 to 3 obtained in Examples 4 to 6 and the comparative inkjet ink compositions 1 to 5 obtained in Comparative Examples 6 to 10 were evaluated as described below.

Evaluation of Image Density

An ink cartridge was charged with the inkjet ink composition or the comparative inkjet ink composition, and an image was printed on plain paper using an inkjet printer ("EM-930C" manufactured by Seiko Epson Corporation). The image density was evaluated by measuring the OD value using a spectrodensitometer ("X-Rite 504" manufactured by Nihonheihankizai Co., Ltd.), and evaluating the average OD value in accordance with the following standard. The results are shown in Tables 3 and 4.

Acceptable: The OD value was 1.4 or more.
Fair: The OD value was 1.3 or more and less than 1.4.
Unacceptable: The OD value was less than 1.3.

Evaluation of Re-Solubility

A drop of the inkjet ink composition or the comparative inkjet ink composition was allowed to fall onto a Teflon (registered trademark) sheet, and dried at 50° C. for 1 hour using an incubator. After washing away the inkjet ink composition or the comparative inkjet ink composition with ion-exchanged water, the presence or absence of a trace of the ink was observed with the naked eye. The re-solubility was evaluated in accordance with the following standard. The above evaluation was performed four times using each inkjet ink composition or comparative inkjet ink composition to confirm repeatability. The results are shown in Tables 3 and 4.

Acceptable: No trace was observed.
Fair: A trace remained to an extent of more than 0% and 30% or less.
Unacceptable: A trace remained to an extent of 70% or more.

Evaluation of Marker Resistance

An ink cartridge was charged with the inkjet ink composition or the comparative inkjet ink composition, and an image was printed on plain paper using an inkjet printer ("EM-930C" manufactured by Seiko Epson Corporation). A line was drawn along the characters printed on the plain paper using a line marker pen ("PM-LM103Y" manufactured by Kokuyo Co., Ltd.), and the marker resistance was evaluated in accordance with the following standard. The results are shown in Tables 3 and 4.

Acceptable: No mark was observed.
Fair: Some marks were observed, or blurring was observed in the print area or around the characters.
Unacceptable: The print area was blurred, and marks were observed around the print area.

TABLE 3

|  |  | Example 4 | Example 5 | Example 6 |
|---|---|---|---|---|
| Storage stability | Particle size | Excellent | Excellent | Excellent |
|  | Viscosity | Excellent | Excellent | Excellent |
| Image density |  | Acceptable | Acceptable | Acceptable |
| Re-solubility |  | Acceptable | Acceptable | Acceptable |
| Marker resistance |  | Acceptable | Acceptable | Acceptable |

TABLE 4

|  |  | Comparative Example 6 | Comparative Example 7 | Comparative Example 8 | Comparative Example 9 | Comparative Example 10 |
|---|---|---|---|---|---|---|
| Storage stability | Particle size | Fair | Fair | Fair | Fair | Poor |
|  | Viscosity | Poor | Poor | Poor | Poor | Poor |

TABLE 4-continued

|  | Comparative Example 6 | Comparative Example 7 | Comparative Example 8 | Comparative Example 9 | Comparative Example 10 |
|---|---|---|---|---|---|
| Image density | Acceptable | Acceptable | Acceptable | Acceptable | Acceptable |
| Re-solubility | Acceptable | Fair | Fair | Fair | Fair |
| Marker resistance | Acceptable | Fair | Fair | Fair | Fair |

As is clear from the results shown in Tables 1 and 3, a pigment dispersion composition (preliminary composition and inkjet ink composition) that exhibits excellent image density, dispersibility, and storage stability, has high re-solubility, and forms an ink film that exhibits excellent marker resistance and scratch resistance, could be easily produced in Examples 1 to 6 by bringing the pigment (I) into contact with the basic compound (II) in the aqueous medium to prepare a pigment having an unreacted surface amino group, bringing the pigment into contact with the polyisocyanate polyurethane resin (III) so that the pigment and the polyisocyanate polyurethane resin (III) are bonded via a urea bond to prepare a dispersion of the polyurethane resin-bonded pigment (A), and heating the dispersion of the polyurethane resin-bonded pigment (A) at 40 to 100° C. for 1 to 30 days.

In contrast, the pigment dispersion compositions obtained in Comparative Examples 1 to 10 exhibited poor storage stability, re-solubility, and/or marker resistance (see the results shown in Tables 2 and 4) since the pigment dispersion composition (comparative preliminary composition and comparative inkjet ink composition) was prepared without heating (Comparative Examples 1, 2, 6, and 7), or prepared without adding a specific polyurethane resin to the pigment (Comparative Examples 3 to 5 and 8 to 10).

Industrial Applicability

The embodiments of the invention thus provide a method that can easily produce a pigment dispersion composition that exhibits excellent image density, dispersibility, and storage stability, has high re-solubility, and forms an ink film that exhibits excellent marker resistance and scratch resistance.

The invention claimed is:

1. A method for producing a pigment dispersion composition comprising bringing a pigment (I) having a surface acidic group and a basic compound (II) having two or more amino groups selected from a primary amino group and a secondary amino group in its molecule, into contact with each other in an aqueous medium to prepare a pigment having an unreacted surface amino group, bringing the pigment into contact with a polyisocyanate polyurethane resin (III) having two or more isocyanate end groups so that the pigment and the polyisocyanate polyurethane resin are bonded via a urea bond to prepare a dispersion of a polyurethane resin-bonded pigment (A), and heating the dispersion of the polyurethane resin-bonded pigment (A) at 40 to 100° C. for 1 to 30 days, wherein the polyisocyanate polyurethane resin (III) having two or more isocyanate end groups has an acid number of 20 to 200 mg KOH/g on a solid basis.

2. The method for producing a pigment dispersion composition according to claim 1, wherein the pigment (I) having a surface acidic group is self-dispersible carbon black having a surface acidic group.

3. The method for producing a pigment dispersion composition according to claim 1, wherein the pigment (I) having a surface acidic group is self-dispersible carbon black having a surface acidic group.

* * * * *